July 19, 1966 K. V. HACKMAN 3,261,624
DUCT JOINT
Filed April 28, 1964

INVENTOR.
KENNETH V. HACKMAN
BY Lyon & Lyon
ATTORNEYS

3,261,624
DUCT JOINT
Kenneth V. Hackman, Arcadia, Calif., assignor to Southwest Products Co., Monrovia, Calif., a corporation of California
Filed Apr. 28, 1964, Ser. No. 363,106
3 Claims. (Cl. 285—62)

The present invention relates to the construction of a duct joint.

In some installations as, for example, on aircraft, a flexible hot air duct system is required which is capable of conducting hot air or gases at, for example, temperatures of 550° F. and higher to different parts of an operating system. Due to vibration and relative movement of parts of the aircraft, flexible couplings are required to accommodate relative movement between various parts.

It is an object of the present invention to provide an improved flexible coupling which is admirably suited for aircraft purposes.

Briefly, as described herein, a coupling or joint construction involves the use of a high temperature resistant plastic liner between relative movable parts of the joint in conjunction with an O-ring seal, the liner being essentially a part of a bearing having good anti-friction properties with the O-ring seal serving to seal the bearing.

Another object of the present invention is to provide a duct joint having good antifriction properties and good sealing properties.

Another object of the present invention is to provide a duct joint of this character which is relatively simple, inexpensive and troublefree in operation.

Another object of the present invention is to provide a duct joint of this character having the above indicated desirable features and which may be quickly disassembled and reassembled.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
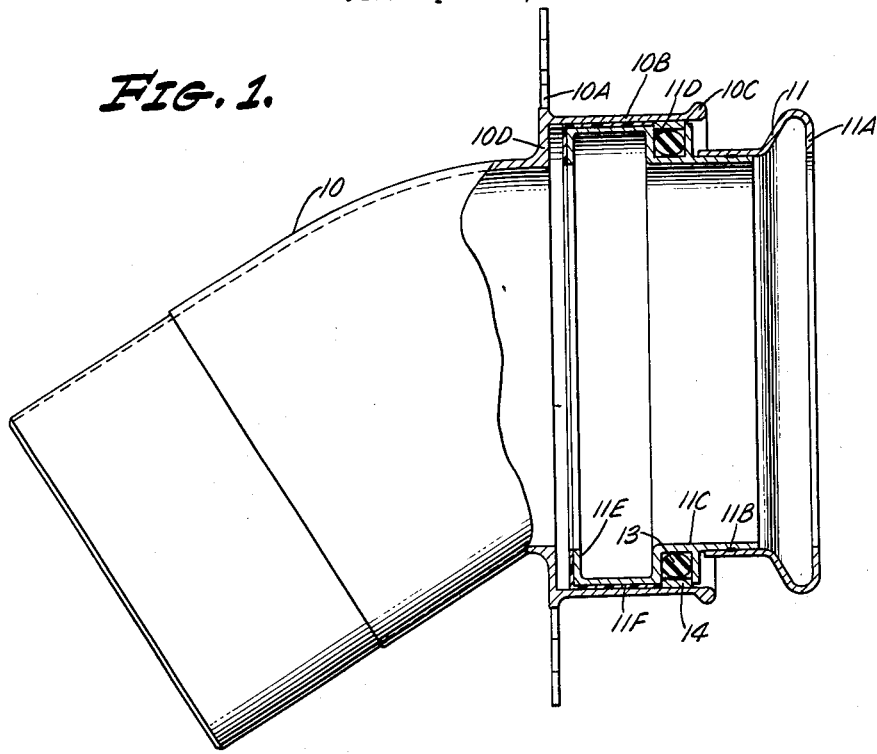
FIG. 1 is a view in side elevation, partly in section, of a duct joint embodying features of the present invention.
Figure 2:
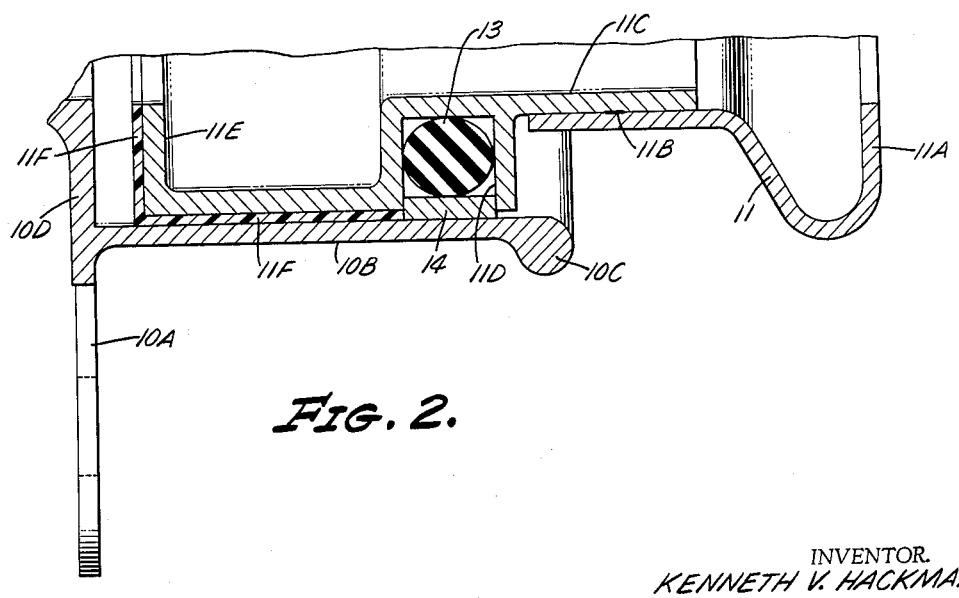
FIG. 2 shows some of the elements of the duct joint on an enlarged scale.

As illustrated, a duct joint includes two duct members 10 and 11, the member 10 being shown in the form of an elbow having a flanged portion 10A, suitably apertured, for stationary mounting on a part of an aircraft. Also integrally formed with the duct member 10 is an enlarged cylindrical or drum-shaped portion 10B which terminates in a bulbous end 10C, this cylindrical portion 10B being integrally formed with the main duct section by a circumferentially extending ring portion 10D in the form of an internal shouldered portion.

The internal duct member 11 includes an outer flanged portion 11A (referred to as a Janitrol flange) for coupling purposes, this flanged portion 11A being roll seam welded at 11B to an externally grooved and internally flanged element 11C, the externally grooved portion being illustrated at 11D and the internally flanged portion being illustrated at 11E. The outer cylindrical surface of element 11C as well as the external surface of the flanged portion 11E is lined with a plastic antifriction liner 11F which is cylindrical and generally L-shaped in cross-section. This plastic liner 11F is of a material referred to as Dyflon and is generally a combination thermosetting and thermoplastic material, the thermoplastic part of the material being small Teflon particles held in solid solution in the thermosetting material.

It will be seen that this plastic liner 11F is a part of a bearing structure having good antifriction properties allowing free rotation of the duct element 11 within the duct element 10, with the liner 11F being disposed adjacent the internal surface of the drum portion 10B and also adjacent the flanged portion 10D.

An O-ring 13 is disposed within the generally U-shaped grooved portion 11D with the ring 14 being disposed between the outer peripheral portion of the ring 13 and the adjacent internal surface of the drum portion 10B, this ring 14 making a close fit with the adjacent internal surface of the drum portion 10B and serving to squeeze the O-ring 13 during assembly to provide a good seal.

The plastic liner 11F in some instances may be bonded to the duct portion 11 or be slid over the same for convenient replacement purposes.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A duct joint of the character described, including an outer duct member, said outer duct member terminating in an outer enlarged cylindrical portion contiguous with an intermediate internal shouldered portion, said outer duct member having an integrally formed flanged portion for mounting, an internal duct member having an outer antifriction plastic liner which is generally L-shaped in cross-section with portions thereof adjacent said shouldered portion and said cylindrical portion, said inner duct member having a circumferentially grooved portion, and an O-ring in said grooved portion.

2. A duct joint as set forth in claim 1 in which said liner is of a combination thermosetting and thermoplastic material.

3. A duct joint including an outer duct member terminating in an outer cylindrical portion contiguous with an intermediate internal shouldered portion, an inner duct member having a cylindrical portion and an inwardly extending flanged portion, a liner of a combination thermosetting and thermoplastic material and of generally L-shaped configuration with portions of said liner being disposed between said cylindrical portions and also between said shouldered and flanged portions, said inner duct member having a circumferentially grooved portion, an O-ring in said grooved portion, and a ring in said grooved portion between said O-ring and said cylindrical portion of said outer duct member.

References Cited by the Examiner
UNITED STATES PATENTS

| 2,438,312 | 3/1948 | Bunn | 285—53 |
| 3,607,644 | 8/1952 | Smith et al. | 277—165 |
| 2,906,552 | 9/1959 | White. | |
| 3,011,803 | 12/1961 | Buckner et al. | |
| 3,155,015 | 11/1964 | Genz | 308—5 X |

CARL W. TOMLIN, *Primary Examiner.*
T. A. LISLE, *Assistant Examiner.*